United States Patent
Kakishima et al.

(10) Patent No.: US 9,780,932 B2
(45) Date of Patent: Oct. 3, 2017

(54) RADIO COMMUNICATION SYSTEM, MOBILE TERMINAL APPARATUS, RADIO BASE STATION APPARATUS AND RADIO COMMUNICATION METHOD

(71) Applicant: NTT DOCOMO, INC., Tokyo (JP)

(72) Inventors: Yuichi Kakishima, Tokyo (JP); Yoshihisa Kishiyama, Tokyo (JP); Satoshi Nagata, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 14/399,048

(22) PCT Filed: Apr. 19, 2013

(86) PCT No.: PCT/JP2013/061638
§ 371 (c)(1),
(2) Date: Nov. 5, 2014

(87) PCT Pub. No.: WO2013/168541
PCT Pub. Date: Nov. 14, 2013

(65) Prior Publication Data
US 2015/0078289 A1 Mar. 19, 2015

(30) Foreign Application Priority Data

May 10, 2012 (JP) .................... 2012-108741

(51) Int. Cl.
*H04L 5/00* (2006.01)
*H04W 72/04* (2009.01)
*H04W 16/32* (2009.01)

(52) U.S. Cl.
CPC ............ *H04L 5/0048* (2013.01); *H04L 5/001* (2013.01); *H04L 5/0051* (2013.01);
(Continued)

(58) Field of Classification Search
CPC .............................. H04L 5/0048; H04L 5/001
(Continued)

(56) References Cited

U.S. PATENT DOCUMENTS 9,166,737 B2 * 10/2015 Papasakellariou .... H04L 1/0073
2012/0163335 A1 * 6/2012 Chung ................... H04L 5/0023
370/330
(Continued)

FOREIGN PATENT DOCUMENTS

EP 2916607 A1 9/2015

OTHER PUBLICATIONS

International Search Report for corresponding International Application No. PCT/JP2013/061638, dated Jun. 11, 2013 (1 page).
(Continued)

*Primary Examiner* — Mang Yeung
*Assistant Examiner* — Peter G Solinsky
(74) *Attorney, Agent, or Firm* — Osha Liang LLP

(57) ABSTRACT

The present invention is designed to realize signaling of DM-RS sequence parameters for improving the flexibility of allocation of DM-RS resources in a system having complex cell structures. According to the radio communication method of the present invention, in a radio communication system supporting a system band formed with a plurality of component carriers by carrier aggregation, a radio base station apparatus allocates uplink DM-RS sequences per mobile terminal apparatus and per component carrier, and reports DM-RS sequence allocation information, and a mobile terminal apparatus generates DM-RS sequences using the allocation information reported from the radio base station apparatus.

9 Claims, 9 Drawing Sheets

(52) U.S. Cl.
CPC .......... *H04L 5/0053* (2013.01); *H04L 5/0094* (2013.01); *H04L 5/0023* (2013.01); *H04W 16/32* (2013.01); *H04W 72/04* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2012/0170526 | A1* | 7/2012 | Wei .......................... | H04L 5/001 370/329 |
| 2013/0051371 | A1* | 2/2013 | Ko .......................... | H04L 1/1861 370/335 |
| 2013/0215823 | A1* | 8/2013 | Shin .......................... | H04L 5/001 370/328 |
| 2013/0215835 | A1* | 8/2013 | Chen ................. | H04W 72/0406 370/329 |
| 2014/0161023 | A1* | 6/2014 | Seo .......................... | H04B 7/024 370/315 |
| 2014/0204854 | A1* | 7/2014 | Freda .......................... | H04L 1/18 370/329 |
| 2015/0092728 | A1* | 4/2015 | Wang .................... | H04L 5/0048 370/329 |
| 2015/0230211 | A1* | 8/2015 | You ....................... | H04L 5/0007 370/330 |

OTHER PUBLICATIONS

3GPP TS 36.211 V10.4.0; "3rd Generation Partnership Project; Technical Specification Group Radio Access Network; Evolved Universal Terrestrial Radio Access (E-UTRA); Physical Channels and Modulation (Release 10);" Dec. 2011 (6 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

Samsung et al; "WF on PUSCH DMRS Signaling;" 3GPP TSG RAN WG1 #68bis, R1-121865; Jeju, Korea; Mar. 26-30, 2012 (2 pages).

NTT DOCOMO; "Views on UL RS for UL CoMP;" 3GPP TSG RAN WG1 Meeting #68bis, R1-121473; Jeju, Korea, Mar. 26-30, 2012 (3 pages).

Office Action dated Jul. 5, 2016, in corresponding Japanese Application No. 2012-108741 (with translation) (7 pages).

Extended Search Report issued in corresponding European Application No. 13787988.8, dated Jan. 8, 2016 (7 pages).

* cited by examiner

| DCI REPORTING BIT (WHEN N=4) | DM-RS SEQUENCE TO USE |
|---|---|
| 00 | SUPPORT REL. 10 SPECIFICATIONS |
| 01 | CANDIDATE 1 |
| 10 | CANDIDATE 2 |
| 11 | CANDIDATE 3 |

FIG.4

RADIO COMMUNICATION SYSTEM, MOBILE TERMINAL APPARATUS, RADIO BASE STATION APPARATUS AND RADIO COMMUNICATION METHOD

TECHNICAL FIELD

The present invention relates to a radio communication system, a mobile terminal apparatus, a radio base station apparatus and a radio communication method.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, it is possible to achieve a transmission rate of about maximum 2 Mbps on the downlink by using a fixed band of approximately 5 MHz. In a system of the LTE scheme, it is possible to achieve a transmission rate of about maximum 300 Mbps on the downlink and about 75 Mbps on the uplink by using a variable band which ranges from 1.4 MHz to 20 MHz. In the UMTS network, for the purpose of achieving further broadbandization and higher speed, successor systems of LTE have been under study as well (for example, LTE-Advanced (LTE-A)). For example, in LTE-A, there is a plan to expand the maximum system band for LTE specifications, which is 20 MHz, to approximately 100 MHz.

LTE-A supports a system band of maximum 100 MHz, which is formed with a plurality of fundamental frequency blocks (hereinafter referred to as "component carriers" (cells) (CCs)), by carrier aggregation. In LTE-A, a heterogeneous network (hereinafter referred to as "HetNet") configuration, which places significance on the local area environment, is under study. A HetNet is a layered network, which overlays cells of various forms such as pico cells, femto cells and relays (small cells), in addition to a conventional macro cell (large cell).

In LTE-A, uplink reference signals are enhanced, and the DM-RS (Demodulation-Reference Signal), which is used in channel estimation upon demodulation of the PUSCH (Physical Uplink Shard Channel) signal and the PUCCH (Physical Uplink Control Channel) signal and so on, is defined. This DM-RS is time-multiplexed and transmitted with RBs (Resource Blocks) that transmit the PUSCH signal/PUCCH signal. For example, in the PUSCH, the DM-RS is multiplexed over the third SC-FDMA (Single Carrier-Frequency Division Multiple Access) symbol in each slot.

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

In LTE-A, considering carrier aggregation and a HetNet, cell structures are becoming complex, and in such complex cell structures, signaling of DM-RS sequence parameters for improving the flexibility of DM-RS resource allocation has not been studied.

The present invention has been made in view of the above, and it is therefore an object of the present invention to provide a radio communication system, a mobile terminal apparatus, a radio base station apparatus, and a radio communication method that are able to realize signaling of DM-RS sequence parameters for improving the flexibility of DM-RS resource allocation in a system having complex cell structures.

Solution to Problem

The radio communication system of the present invention is a radio communication system having a radio base station apparatus and a mobile terminal apparatus that is configured to be able to communicate with the radio base station apparatus, and in the radio communication system, supporting a system band formed with a plurality of component carriers by carrier aggregation, the radio base station apparatus has an allocation section that allocates uplink demodulation reference signal sequences per mobile terminal apparatus and per component carrier, a reporting section that reports allocation information of the demodulation reference signal sequences, and the mobile terminal apparatus has a generating section that generates demodulation reference signal sequences using the allocation information reported from the radio base station apparatus.

The radio base station apparatus of the present invention is a radio base station apparatus in a radio communication system having the radio base station apparatus and a mobile terminal apparatus that is configured to be able to communicate with the radio base station apparatus, and supporting a system band formed with a plurality of component carriers by carrier aggregation, and this radio base station apparatus has an allocation section that allocates uplink demodulation reference signal sequences per mobile terminal apparatus and per component carrier and a reporting section that reports allocation information of the demodulation reference signal sequences.

The mobile terminal apparatus of the present invention is a mobile terminal apparatus in a radio communication system, having a radio base station apparatus and the mobile terminal apparatus that is configured to be able to communicate with the radio base station apparatus, and supporting a system band formed with a plurality of component carriers by carrier aggregation, and this mobile terminal apparatus has a generating section that generates demodulation reference signal sequences using allocation information that is reported from the radio base station apparatus, and that is allocated per mobile terminal apparatus and per component carrier.

The radio communication method of the present invention is a radio communication method in a radio communication system having a radio base station apparatus and a mobile terminal apparatus that is configured to be able to communicate with the radio base station apparatus, and supporting a system band formed with a plurality of component carriers by carrier aggregation, and in the radio base station apparatus, having the steps of allocating uplink demodulation reference signal sequences per mobile terminal apparatus and per component carrier, and reporting allocation information of the demodulation reference signal sequences, and, in the mobile terminal apparatus, having the step of generating demodulation reference signal sequences using the allocation information reported from the radio base station apparatus.

Technical Advantage of the Invention

According to the present invention, it is possible to realize signaling of DM-RS sequence parameters for improving the flexibility of DM-RS resource allocation in a system having complex cell structures.

BRIEF DESCRIPTION OF THE DRAWINGS

FIG. 4 is a diagram to explain an example of DCI reporting bits.

DESCRIPTION OF EMBODIMENTS

Now, an embodiment of the present invention will be described below in detail with reference to the accompanying drawings. Although a successor system of LTE will be described as "LTE-A" in the following descriptions, the system is by no means limited to this name, and may be referred to as, for example, "IMT-A" or "4G."

Figure 1:
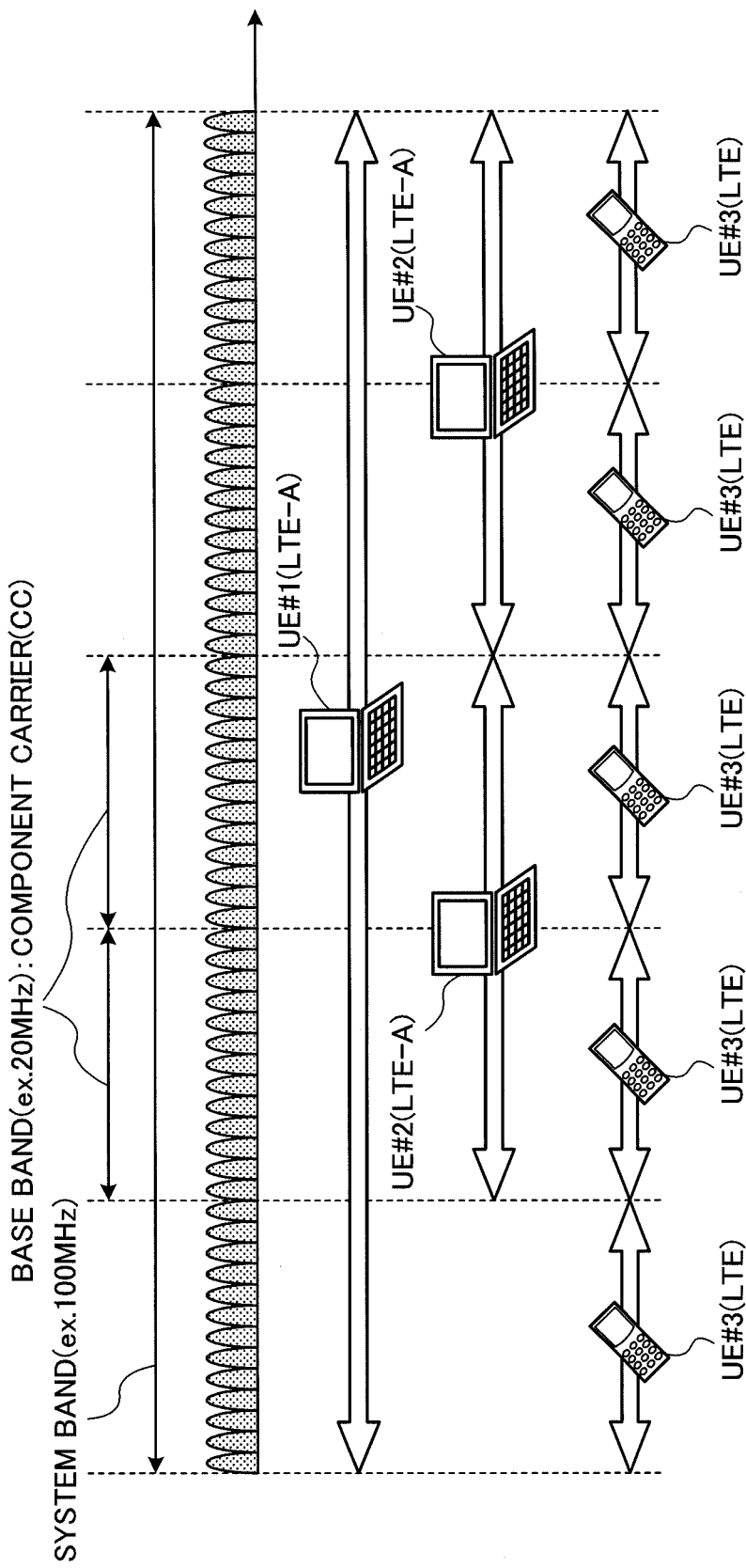
FIG. 1 is a diagram to explain carrier aggregation.

FIG. 1 is a diagram to explain a state of use of frequency when radio communication is carried out on the downlink. The example shown in FIG. 1 is a state of use of frequency that is assumed when an LTE-A system, which is a first communication system having a relatively wide first system band formed with a plurality of fundamental frequency blocks (CCs), and an LTE system, which is a second communication system having a relatively narrow second system band (here, formed with one component carrier), coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system is at least one fundamental frequency block, where the system band of the LTE system is one unit. Coupling a plurality of fundamental frequency blocks into a wide band as one in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system) and has a system band of 100 MHz, UE #2 is a mobile terminal apparatus to support the LTE-A system (and also support the LTE system) and has a system band of 40 MHz (20 MHz× 2=40 MHz), and UE #3 is a mobile terminal apparatus to support the LTE system (and does not support the LTE-A system) and has a system band of 20 MHz (base band).

Figure 2:
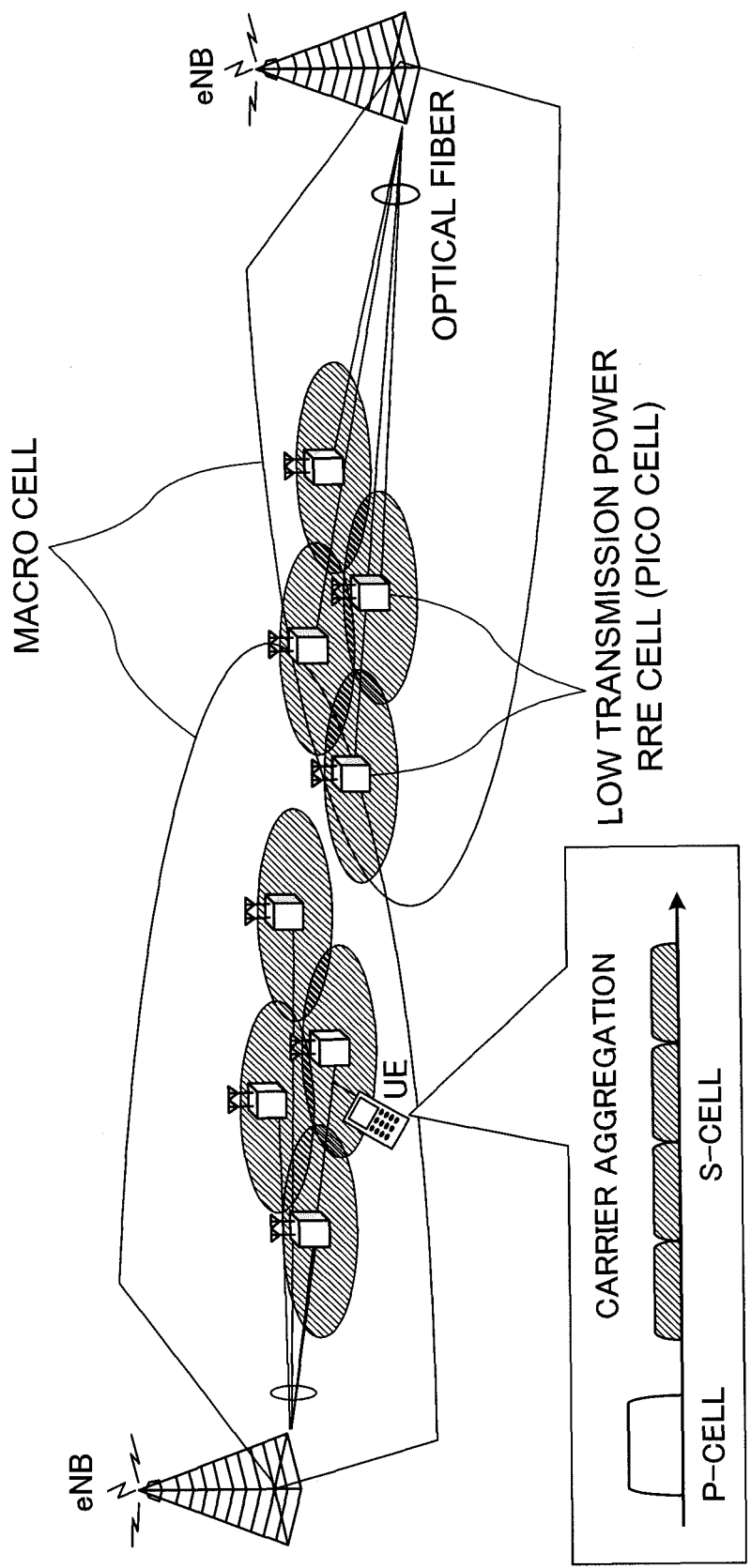
FIG. 2 is a diagram to explain carrier aggregation in a HetNet.

In LTE-A, it is possible to realize effective use of frequency resources by combining a HetNet and carrier aggregation. For example, as shown in FIG. 2, in a configuration where low transmission power RRE cells (pico cells) are overlaid on macro cells (large cells), a scenario to execute carrier aggregation between component carriers of the macro cells (P cells) and component carriers of the pico cells (S cells) may be possible. In FIG. 2, the radio base station apparatuses (eNBs) of the macro cells are connected to the radio base station apparatuses of the pico cells by optical fiber. In this system, for example, the P cells transmit control channel signals and the S cells transmit data. By this means, it is possible to realize effective use of frequency resources.

For the DM-RS to use in channel estimation upon demodulation of the PUSCH signal and the PUCCH signal, the Zadoff-Chu (ZC)-based sequence shown in following equation 1 is used. In LTE and LTE-A, varying ZC sequences are applied between neighboring cells, so that DM-RSs are randomized between cells.

$$x_q(m) = \begin{cases} e^{-j\pi \cdot qm(m+1)/N} & N = \text{odd number} \\ e^{-j\pi \cdot qm^2/N} & N = \text{even number} \end{cases} \quad \text{[Formula 1]}$$

where:
N is the sequence length;
q is the sequence number; and $$0 \leq m \leq N-1 \text{ holds.} \quad \text{(Equation 1)}$$

In above equation 1, if the sequence length N and the sequence number q are prime to each other, the cross correlation value becomes $1/\sqrt{N}$. This means that, when the sequence length N is a prime number, (N−1) sequences can be generated. ZC sequences have a zero autocorrelation characteristic (the correlation between a given ZC sequence and a sequence given by applying a cyclic shift to that ZC sequence is zero).

In LTE of Rel. 8 to Rel. 10, processing is carried out per RB (12 subcarriers), so that a ZC sequence length of 12 n is required. Since 12 n is not a prime number, the number of randomized sequences that can be generated is small, and therefore a sufficient number of randomized sequences cannot be acquired. Consequently, DM-RS sequences are generated by applying cyclic extension, whereby the data of a front part is copied to a rear part, to a ZC sequence having a length to match the largest prime number, not exceeding the required ZC sequence length. By doing so, it is possible to increase the number of sequences. The ZC sequence is generated by the algorithm shown in following equation 2 (when the ZC sequence length is 3 RBs or greater). The number of randomized sequences is a number of randomized sequences to correspond to a ZC sequence having a length of a prime number not exceeding the reference signal length.

[Formula 2]

$$\bar{r}_{u,v}(n) = x_q(n \bmod N_{ZC}^{RS}), 0 \le n < M_{sc}^{RS} \quad \text{(Equation 2)}$$
$$x_q(m) = e^{-j\frac{\pi q m(m+1)}{N_{ZC}^{RS}}}, 0 \le m \le N_{ZC}^{RS} - 1$$
$$q = \lfloor \bar{q} + 1/2 \rfloor + v \cdot (-1)^{\lfloor 2\bar{q} \rfloor}$$
$$\bar{q} = N_{ZC}^{RS} \cdot (u+1)/31$$

In equation 2, u is the group number, v is the base sequence number, and q is the sequence number.

In LTE of Rel. 8 to Rel. 10, in order to make the system simple, the number of sequences to use for DM-RSs is set to 30 or 60, depending on the number of RBs. In a bandwidth of 1 RB to 5 RBs, the number of randomized DM-RS sequences is set to 30, and, in a bandwidth of 6 RBs to 8 RBs, the number of randomized DM-RS sequences is set to 60.

In this case, in the bandwidth of 1 RB to 2 RBs, the number of randomized sequences does not reach 30 even if the above-described cyclic extension is applied, so that 30 randomized sequences, calculated by means of a calculator, are used. In the bandwidth of 3 RBs to 5 RBs, among the DM-RS sequences generated by applying cyclic extension to the ZC sequence generated using above equation 2, 30 DM-RS sequences are used. In the bandwidth of 6 RBs or more, among the DM-RS sequences generated by applying cyclic extension to the ZC sequence generated using above equation 2, 60 DM-RS sequences are used. DM-RSs are generated by following equation 3, using the DM-RS sequences.

[Formula 3]

$$r_{u,v}^{(\alpha)}(n) = e^{j\alpha n}\bar{r}_{u,v}(n), 0 \le n < M_{sc}^{RS} \quad \text{(Equation 3)}$$

In equation 3, u is the group number, v is the base sequence number, q is the sequence number, and α is the cyclic shift number.

As shown in equations 2 and 3, group numbers (u=0 to 29) (indices) are assigned to the 30 DM-RS sequences, and group numbers (u=0 to 29) and base sequence numbers (v=0, 1) (indices) are assigned to the 60 DM-RS sequences, so that identification can be made. In Rel. 10 LTE, when group hopping, which will be described later, is executed, the base sequence number is "0" and fixed. These group numbers and base sequence numbers can be each calculated from the cell IDs. The sequence number q can be calculated from the group number u and the base sequence number v. The information about cyclic shift in equation 3 is reported from a radio base station apparatus to a mobile terminal apparatus through L1/L2 signaling.

Although, in LTE of Rel. 8 to Rel. 10, 60 DM-RS sequences can be prepared and these DM-RS sequences can be identified individually based on group numbers and base sequence numbers and used, when group hopping to be described later is executed, only 30 DM-RS sequences are used, using the base sequence number 0 alone.

When assigning DM-RS sequences like such, for example, it may be possible that, if the same DM-RS sequence (group number and base sequence number) is assigned between neighboring cells, the DM-RS collides in mobile terminal apparatuses, and the DM-RS causes significant interference against other cells, the accuracy of channel estimation decreases, and the performance of demodulation deteriorates.

So, in LTE of Rel. 8 to Rel. 10, the group numbers to use upon generating DM-RS sequences are hopped per slot, to reduce the possibility of DM-RS collisions between neighboring cells (group hopping). The patterns in this hopping use Gold sequences, and the number of these sequences is 17.

Figure 3:
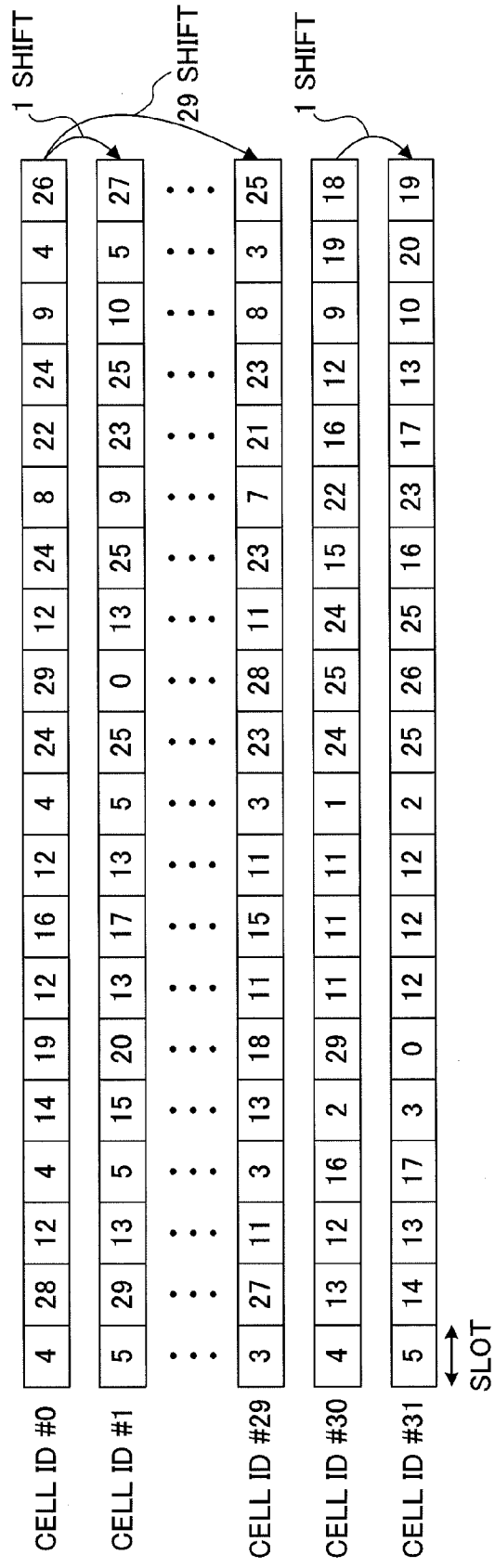
FIG. 3 is a diagram to explain group hopping.

To be more specific, as shown in FIG. 3, the patterns for cell IDs #0 to #29 are generated from one random sequence (Gold sequence), the patterns for cell IDs #30 to #59 are generated from one random sequence, the patterns for cell IDs #60 to #89 are generated from one random sequence, . . . , and the patterns for cell IDs #480 to #509 are generated from one random sequence. The group number in each slot in each pattern is cyclically shifted. For example, cell ID #0 and cell ID #1 in FIG. 3 are shifted through 1, and cell ID #0 and cell ID #29 are shifted through 29. Cell ID #30 and cell ID #31 are shifted through 1.

In this way, by using group hopping, it is possible to reduce the possibility of DM-RS collisions between neighboring cells. In this case, the number of random sequences (Gold sequences) is 17, and there are 30 group numbers from 0 to 29, so that it is possible to secure a total of 510 DM-RS sequences, and, in Rel. 10 LTE, among these, DM-RS sequences for 504 cells are used. The application of group hopping, the hopping method and so on are reported from a radio base station apparatus to a mobile terminal apparatus through higher layer signaling (for example, broadcast information).

The above-described signaling of DM-RS sequence parameters in Rel. 10 LTE is signaling per cell, and in complex cell structures such as used in carrier aggregation or the HetNet described above, the flexibility of DM-RS resource allocation was low. In particular, when the connecting cell varies per component carrier, it is possible to prevent interference, with higher accuracy, by orthogonalizing DM-RSs per user and per component carrier. So, the present inventors have found out signaling of DM-RS sequence parameters for improving the flexibility of DM-RS resource allocation, in a system having complex cell structures such as used in carrier aggregation and the HetNet described above, and have arrived at the present invention.

That is, a gist of the present invention is to realize signaling of the DM-RS sequence parameters for improving the flexibility of DM-RS resource allocation, by allocating uplink DM-RS sequences per mobile terminal apparatus and per component carrier and reporting DM-RS sequence allocation information in a radio base station apparatus, and by generating DM-RS sequences in the mobile terminal apparatus, using the allocation information reported from the radio base station apparatus.

With the present invention, uplink DM-RS sequences are allocated per mobile terminal apparatus and per component carrier, and DM-RS sequence allocation information is reported (signaled) from the radio base station apparatus to the mobile terminal apparatus. For example, in a system having a frequency band formed with a plurality of component carriers (cells), parameters that are required to generate DM-RS sequences to allocate per mobile terminal apparatus UE and per component carrier are signaled. For example, in the system configuration shown in FIG. 2, the radio base station apparatus eNB allocates one DM-RS sequence to the P-Cell of a mobile terminal apparatus UE, and allocates another DM-RS sequence to the S-Cells of the mobile terminal apparatus UE. Then, the radio base station apparatus signals this allocation information to the mobile terminal apparatus UE. As this method, the following methods may be possible.

Here, allocation information means information required to generate DM-RS sequences, and refers to information to be used when allocating DM-RS sequences. As allocation information, for example, parameters used in generation algorithms of DM-RS sequences, indices required to derive DM-RS sequences, parameters related to the indices, as will be described later, may be included.

(First Method)

With a first method, the sequence number q used to generate DM-RS sequences (sequence number q in the ZC sequence generation algorithm of above equation 2) is directly signaled (reported). In Rel. 10 LTE, the group number u and the base sequence number v in the ZC sequence generation algorithm (DM-RS generation algorithm) of above equation 2 are signaled. The sequence number q is determined in a mobile terminal apparatus from the group number u and the base sequence number v that are signaled. The group number u and the base sequence number v are both values that can be determined from the cell IDs. Consequently, in Rel. 10 LTE, the signaling of ZC sequences is signaling to be carried out on a per cell basis.

However, as described above, in order to improve the flexibility of DM-RS sequence allocation taking complex cell structures into account, signaling needs to be carried out on a per UE basis, not on a per cell basis. The sequence number q in the ZC sequence generation algorithm of equation 2 is determined from the group number u and the base sequence number v, so it necessarily follows that the sequence number q is also a parameter that is associated with cell IDs.

So, in the first method, the sequence number q is directly signaled from a radio base station apparatus to a mobile terminal apparatus, thereby using the sequence number q as a UE-specific parameter. By this means, it is possible to carry out signaling on a per UE basis, and improve the flexibility of DM-RS resource allocation.

With the first method, it may be possible to implicitly derive a plurality of sequence number candidates, in advance, using the above indices, and send signaling as to which of these sequence number candidates is used, through lower layers. That is, a plurality of sequence number candidates are dynamically switched around by means of lower layer signaling. For example, in a HetNet environment, by deriving a plurality of sequence number candidates in advance, based on the cell IDs or $V_{cell}$IDs used in neighboring macro cells and pico cells, it is possible to reduce the overhead of signaling. The method of deriving sequence numbers q implicitly from the above indices will be described later.

For the signaling of the sequence number q, it may be possible to use a broadcast channel and higher layer signaling such as RRC signaling, or it may be possible to use lower layer signaling as well. With lower layer signaling, reporting may be carried out using DCI (Downlink Control Information) of the PDCCH (Physical Downlink Control Channel), or reporting may be carried out using DCI of the enhanced PDCCH (EPDCCH), or reporting may be carried out using both.

(Second Method)

A second method is a method to implicitly derive the sequence number q, in a mobile terminal apparatus, from indices that are signaled from the radio base station apparatus to the mobile terminal apparatus through higher layer signaling—for example, cell IDs, virtual cell IDs ($V_{cell}$IDs), UEIDs, virtual UEIDs ($V_{UE}$IDs) and so on.

In Case of a Cell ID

In this case, for example, the same signaling method as in Rel. 10 LTE is used. To be more specific, a group number u and a base sequence number v are derived from following equations 4 to 8, and a sequence number q is derived using the derived group number u and base sequence number v.

[Formula 4]
$$u = (f_{gh}(n_s) + f_{ss}) \bmod 30 \quad \text{(Equation 4)}$$

[Formula 5]
$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{(Equation 5)}$$

[Formula 6]
$$f_{ss}^{PUSCH} = N_{ID}^{cell} \bmod 30 \quad \text{(Equation 6)}$$

[Formula 7]
$$f_{ss}^{PUSCH} = (f_{ss}^{PUSCH} + \Delta_{ss}) \bmod 30 \quad \text{(Equation 7)}$$

[Formula 8]
$$v = \begin{cases} c(n_s) & \text{if group hopping is disabled and sequence hopping is enabled} \\ 0 & \text{otherwise} \end{cases} \quad \text{(Equation 8)}$$

In Case of a $V_{cell}$ID

In this case, for example, a $V_{cell}$ID number is used instead of the cell ID number $N_{ID}^{cell}$ in above equation 6, assuming that c in above equations 5 and 8 is associated with the $V_{cell}$ID, and a group number u and a base sequence number v are derived, assuming that $\Delta_{SS}$ in above equation 7 is associated with the $V_{cell}$ID, and then a sequence number q is derived using the derived group number u and base number v. Since this method has good compatibility with the scheme of Rel. 10 LTE, this is a feasible method.

In Case of a UEID

In this case, for example, a UEID number is used instead of the cell ID number $N_{ID}^{cell}$ in above equation 6, assuming that c in above equations 5 and 8 is associated with the UEID, and a group number u and a base sequence number v are derived, assuming that $\Delta_{SS}$ in above equation 7 is associated with the UEID, and then a sequence number q is derived using the derived group number u and base number v. Alternatively, in this case, when the maximum number of DM-RS sequences that the system can secure is X, the sequence number q can be derived by performing a division calculation between the UEID and X (UEID % X).

In Case of a $V_{UE}$ID

In this case, for example, a $V_{UE}$ID number is used instead of the cell ID number $N_{ID}^{cell}$ in above equation 6, assuming that c in above equations 5 and 8 is associated with the $V_{UE}$ID, and a group number u and a base sequence number v are derived assuming that $\Delta_{SS}$ in above equation 7 is associated with the $V_{UE}$ID, and then a sequence number q is derived using the derived group number u and base number v. Alternatively, in this case, when the maximum number of DM-RS sequences that the system can secure is X, the sequence number q can be derived by performing a division calculation between the $V_{UE}$ID and X ($V_{UE}$ID % X).

The method to use a UEID and a $V_{UE}$ID is particularly effective to just randomize DM-RSs using different DM-RS sequences between users in the same cell.

(Third Method)

A third method is a method to combine higher layer signaling and lower layer signaling. That is, this method is a method to report DM-RS sequence allocation information to the mobile terminal apparatus through higher layer signaling and lower layer signaling. For example, information (for example, table) associating bits and DM-RS sequences to report through lower layers (for example, N DM-RS sequences) is reported through higher layer signaling, and bits to represent DM-RS sequences are dynamically signaled through lower layers (DCI of the PDCCH). To be more specific, as the third method, the following three methods may be possible.

(3-1)

In a carrier aggregation environment such as shown in FIG. 2, this method reports a plurality of (for example, N) DM-RS sequence candidates to the mobile terminal apparatus per component carrier through higher layer signaling of the P-Cell, and chooses one from the DM-RS sequence candidates per component carrier through lower layer signaling. By making reporting on a per component carrier basis, realization of more accurate signaling or an effect to reduce N is anticipated.

(3-2)

In a carrier aggregation environment such as shown in FIG. 2, this method reports a plurality of (for example, N) DM-RS sequence candidates that are common in all component carriers to the mobile terminal apparatus through higher layer signaling of the P-Cell, and chooses one from the DM-RS sequence candidates per component carrier through lower layer signaling. It is considered that this method makes the procedures to redundantly signal common features (for example, a neighboring cell) between component carriers unnecessary, and is effective to reduce the signaling overhead.

(3-3)

This method is a method to make one of N DM-RS candidates reported through higher layer signaling, information to support Rel. 10 LTE specifications. To be more specific, as shown in FIG. 4, the bits "00" are associated with Rel. 10 specifications, and the other bits "01," "10," and "11" are associated with each DM-RS sequence candidates (candidate 1 to candidate 3). The table shown in FIG. 4 is an example, and is by no means limited to this. In this method, by realizing the same control as in Rel. 10 LTE specifications, simplified system operation can be expected.

With this method, one of N DM-RS candidates reported through higher layer signaling is made a default value, and the other N−1 DM-RS candidates are represented in relative relationships from the default value, and these relative relationships are signaled through lower layers. As relative relationships, for example, difference values from the default value may be used. In this way, it is possible to reduce the overhead of signaling.

With the third method, with respect to higher layer signaling, it is possible to reduce the overhead of signaling by applying common signaling between mobile terminal apparatuses in the cell, so that it is possible to improve the flexibility of signaling by applying independent signaling between mobile terminal apparatuses in the cell.

Regarding the above first to third methods, in a carrier aggregation environment formed with a plurality of component carriers, signaling may be carried out on a per component carrier (cell) basis, or signaling may be carried out on a per group basis by grouping a plurality of component carriers (cells). As an example of the latter case, a P-Cell and an S-Cell may be set as separate groups, or may be set as groups on a per frequency band basis. This grouping may be carried out using either higher layer signaling or lower layer signaling, or may be carried out using both.

Figure 5:
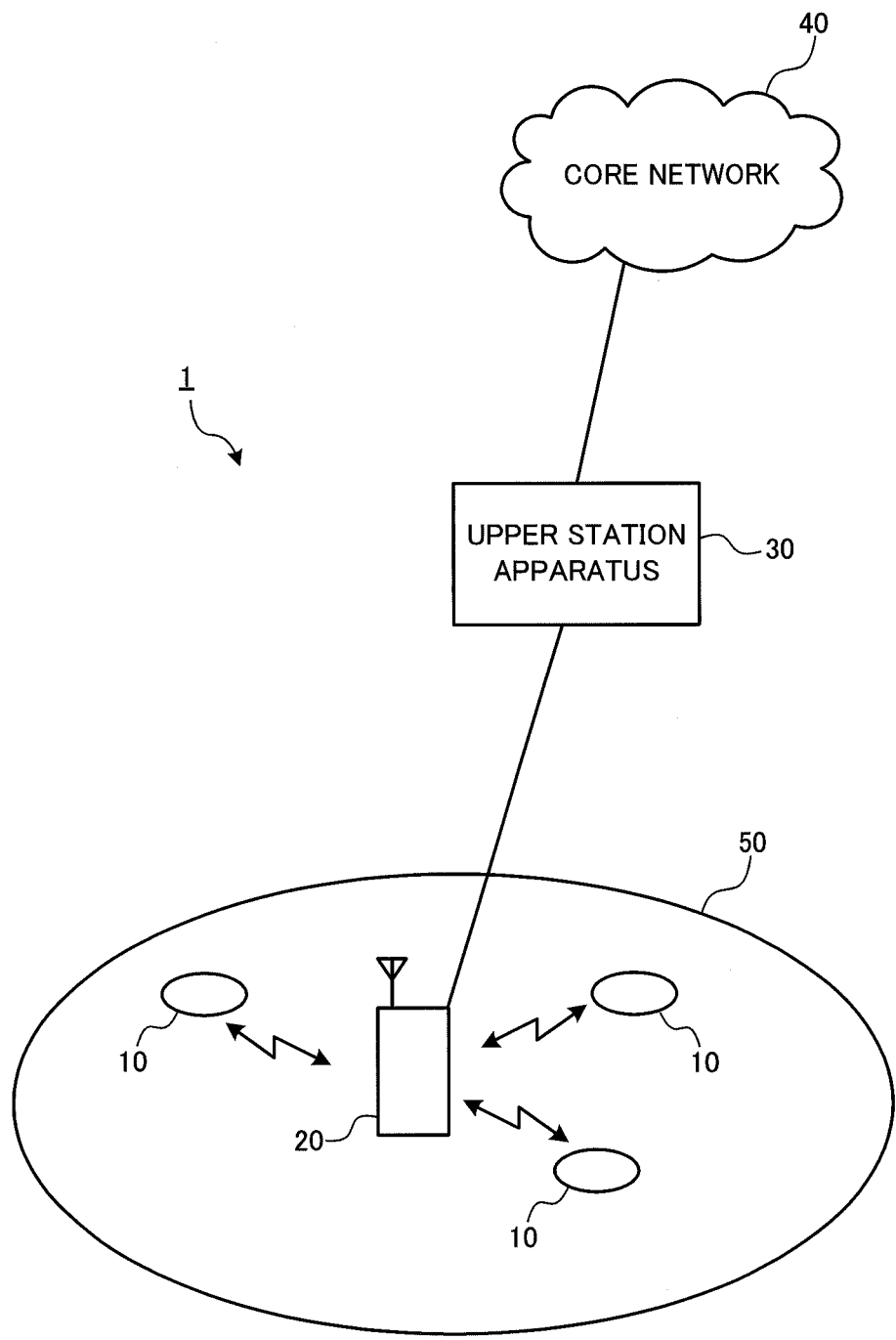
FIG. 5 is a diagram to show a radio communication system according to an embodiment of the present invention.

Now, a configuration of a radio communication system according to an embodiment of the present invention will be described below. FIG. 5 is a schematic diagram to show a radio communication system according to the embodiment of the present invention.

The radio communication system 1 is, for example, a system where LTE-A is applied. The radio communication system 1 has a radio base station apparatus 20, and a plurality of mobile terminal apparatuses 10 that communicate with this radio base station apparatus 20. The radio base station apparatus 20 is connected with a higher station, which is, for example, a higher station apparatus 30, and this higher station apparatus 30 is connected with a core network 40. The mobile terminal apparatuses 10 communicate with the radio base station apparatus 20 in a cell 50 by evolved UTRA and UTRAN. The higher station apparatus 30 may be referred to as MME/SGW (Mobility Management Entity/Serving Gateway).

The mobile terminal apparatuses 10 have the same configuration, functions, and state. Although the mobile terminal apparatuses 10 will be described to perform radio communication with the radio base station apparatus 20 for ease of explanation, more generally, user equipment (UE) to include both mobile terminal apparatuses and fixed terminal apparatuses may be used as well.

In the radio communication system 1, as radio access schemes, radio access that is based on OFDMA (Orthogonal Frequency Division Multiple Access) is applied to the downlink, and radio access that is based on SC-FDMA (Single-Carrier-Frequency-Division Multiple Access) is applied to the uplink. OFDMA (Orthogonal Frequency Division Multiplexing Access) is a multi-carrier transmission scheme to divide a frequency band into a plurality of narrow frequency bands (subcarriers) and place and transmit data on each subcarrier. SC-FDMA (Single-Carrier Frequency Division Multiple Access) is a single carrier transmission scheme to reduce interference between terminals by dividing, per terminal, the system band into bands formed with one or continuous resource blocks, and allowing a plurality of terminals to use mutually different bands.

Communication channels in evolved UTRA and UTRAN will be described. On the downlink, the PDSCH (Physical Downlink Shared Channel), which is used by each mobile terminal apparatus 10 on a shared basis, and the PDCCH (also referred to as the downlink L1/L2 control channel), which is a downlink control channel, are used. By means of the above PDSCH, user data—that is, normal data signals—is transmitted. By means of the PDSCH, precoding information for uplink MIMO transmission, information of the IDs of users that communicate using the PDSCH and the users' data transport format (that is, downlink scheduling information), and information of the IDs of users that communicate using the PUSCH (Physical Uplink Shared Channel) and the users' data transport format (that is, uplink scheduling grant) and so on are fed back.

On the downlink, broadcast channels such as the P-BCH (Physical-Broadcast CHannel) and the D-BCH (Dynamic Broadcast CHannel) are transmitted. Information that is transmitted by means of the P-BCH is MIBs (Master Information Blocks), and information that is transmitted by means of the D-BCH is SIBs (System Information Blocks).

The D-BCH is mapped to the PDSCH, and transmitted from the radio base station apparatus 20 to the mobile terminal apparatuses 10.

On the uplink, the PUSCH, which is used by each mobile terminal apparatus 10 on a shared basis, and the PUCCH (Physical Uplink Control Channel), which is an uplink control channel, are used. By means of the PUSCH, user data—that is, normal data signals—is transmitted. By means of the PUCCH, precoding information for downlink MIMO transmission, delivery acknowledgment information for downlink shared channels, downlink radio quality information (CQI: Channel Quality Indicator) and so on are transmitted.

In the uplink, the PRACH (Physical Random Access Channel) for initial connection and so on is defined. The mobile terminal apparatuses 10 are designed to transmit random access preambles to the radio base station apparatus 20 in the PRACH.

Figure 6:
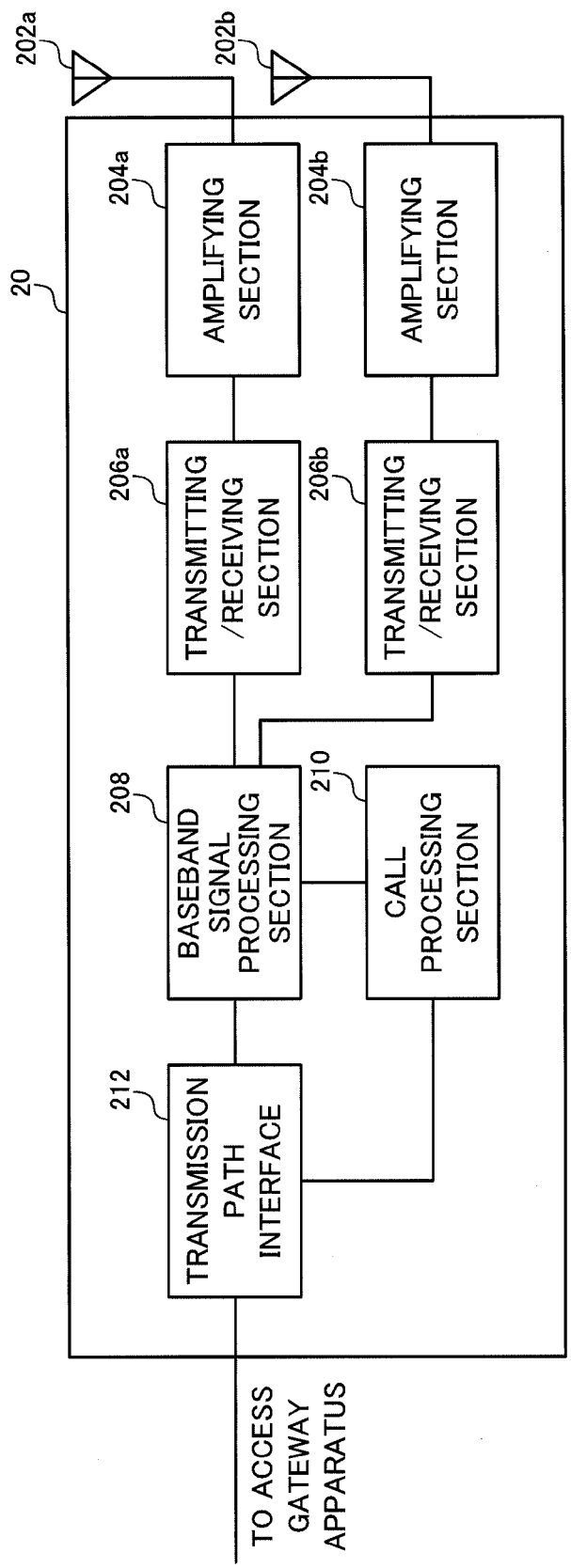
FIG. 6 is a block diagram to show a configuration of a radio base station apparatus according to the above embodiment.

Next, a configuration of the radio base station apparatus 20 according to the present embodiment will be explained with reference to FIG. 6. As shown in FIG. 6, the radio base station apparatus 20 according to the present embodiment has two transmitting/receiving antennas 202*a* and 202*b* for MIMO transmission, amplifying sections 204*a* and 204*b*, transmitting/receiving sections 206*a* and 206*b*, a baseband signal processing section 208, a call processing section 210, and a transmission path interface 212.

User data that is transmitted on the downlink from the radio base station apparatus 20 to the mobile terminal apparatus 10 is input in the baseband signal processing section 208, through the transmission path interface 212, from a higher station positioned above the radio base station apparatus 20, for example, from the higher station apparatus 30.

The baseband signal processing section 208 performs a PDCP layer process, division and coupling of user data, RLC (Radio Link Control) layer transmission processes such as an RLC retransmission control transmission process, MAC (Medium Access Control) retransmission control, including, to for example, an HARQ (Hybrid Automatic Repeat reQuest) transmission process, scheduling, transport format selection, channel coding, an inverse fast Fourier transform (IFFT) process, and a precoding process, and transfers the result to the transmitting/receiving sections 206*a* and 206*b*. The PDCCH signal is also subjected to transmission processes such as channel coding and an inverse fast Fourier transform, and then transferred to the transmitting/receiving sections 206*a* and 206*b*.

The baseband signal processing section 208 feeds back control information for communication in the cell to the mobile terminal apparatus 10, through the above-described broadcast channels. The control information for communication in the cell includes, for example, the uplink or downlink system bandwidth, resource block information allocated to the mobile terminal apparatus 10, root sequence identification information (root sequence index) for generating random access preamble signals in the PRACH and so on.

Baseband signals that are precoded and output from the baseband signal processing section 208 on a per antenna basis are subjected to a frequency conversion process to be converted into a radio frequency band in the transmitting/receiving sections 206*a* and 206*b*, and, after that, amplified in the amplifying sections 204*a* and 204*b* and transmitted from the transmitting/receiving antennas 202*a* and 202*b*. With the present invention, the transmitting/receiving sections 206*a* and 206*b* constitute a reporting section to report DM-RS sequence allocation information.

As for data to be transmitted from the mobile terminal apparatus 10 to the radio base station apparatus 20 on the uplink, radio frequency signals that are received in the transmitting/receiving antennas 202*a* and 202*b* are amplified in the amplifying sections 204*a* and 204*b*, converted into baseband signals through frequency conversion in the transmitting/receiving sections 206*a* and 206*b*, and input in the baseband signal processing section 208.

The baseband signal processing section 208 applies, to the user data included in the baseband signals received as input, an FFT process, an IDFT process, error correction decoding, a MAC retransmission control receiving process, and RLC layer and PDCP layer receiving processes, and the results are transferred to the higher station apparatus 30 via the transmission path interface 212.

The call processing section 210 performs call processing such as setting up and releasing communication channels, manages the state of the radio base station apparatus 20, and manages the radio resources.

Figure 7:
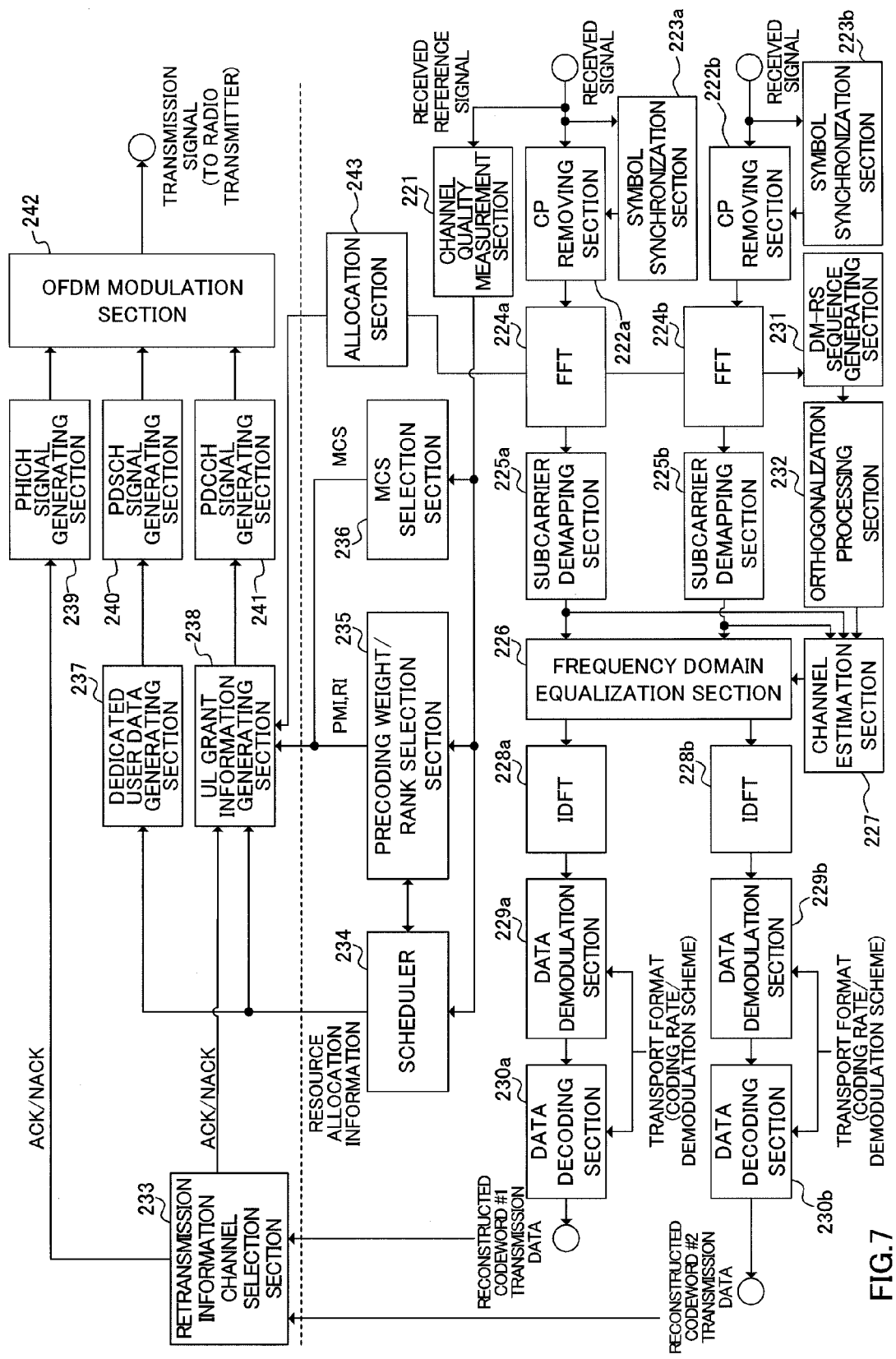
FIG. 7 is a functional block diagram of a baseband signal processing section in the radio base station apparatus shown in FIG. 6.

Now, a configuration of the baseband signal processing section 208 of the radio base station apparatus 20 according to the present embodiment will be described with reference to FIG. 7. FIG. 7 is a functional block diagram of the baseband signal processing section 208 in the radio base station apparatus 20 according to the present embodiment. In FIG. 7, for ease of explanation, configurations such as a scheduler 234 and others are also included.

Reference signals (quality measurement reference signals) included in received signals are input in a channel quality measurement section 221. The channel quality measurement section 221 measures uplink channel quality information (CQI) based on the received state of the reference to signals received from the mobile terminal apparatus 10. Received signals that are input in the baseband signal processing section 208 have the cyclic prefixes attached to the received signals removed in CP (Cyclic Prefix) removing sections 222*a* and 222*b*, and, after that, converted into frequency domain information through a Fourier transform in fast Fourier transform (FFT) sections 224*a* and 224*b*. Symbol synchronization sections 223*a* and 223*b* estimate the synchronization timing from the reference signals included in the received signals, and report the estimation result to the CP removing sections 222*a* and 222*b*.

The received signals, converted in the frequency domain information, are demapped in the frequency domain in subcarrier demapping sections 225*a* and 225*b*. The subcarrier demapping sections 225*a* and 225*b* perform demapping in accordance with the mapping in the mobile terminal apparatus 10. A frequency domain equalization section 226 equalizes the received signals based on channel estimation values provided from a channel estimation section 227. The channel estimation section 227 estimates the channel state from the reference signals included in the received signals.

A DM-RS sequence generating section 231 generates uplink DM-RS sequences (DM-RSs). The DM-RS sequence generating section 231 generates DM-RS sequences based on allocation information that is allocated in an allocation section 243, which will be described later. Above equation 2 and equation 3 are used for the generation of DM-RS sequences. The DM-RS sequence generating section 231 outputs the generated DM-RS sequences to an orthogonalization processing section 232.

The orthogonalization processing section 232 performs processes to undo the orthogonalization process applied to the DM-RS upon uplink transmission. That is, to the CS that is applied to the DM-RSs, the orthogonalization processing section 232 applies a CS of the opposite direction, and, to the OCC applied to the DM-RSs, the orthogonalization processing section 232 applies a despreading process. The orthogonalization processing section 232 outputs the DM-RS, converted back to the original, to the channel estimation section 227.

Inverse discrete Fourier transform (IDFT) sections 228a and 228b perform an inverse discrete Fourier transform on the received signal and converts the frequency domain signal back to a time domain signal. Data demodulation sections 229a and 229b and data decoding sections 230a and 230b reconstruct the transmission data based on the transmission format (coding rate, modulation scheme and so on). By this means, transmission data of codeword #1 corresponding to the first transport block, and transmission data of codeword #2 corresponding to the second transport block are reconstructed.

The transmission data of the reconstructed code words #1 and #2 is output to a retransmission information channel selection section 233. The retransmission information channel selection section 233 determines whether or not it is necessary to retransmit the transmission data of codewords #1 and #2 (ACK/NACK). Then, depending on whether or not it is necessary to retransmit the transmission data of codewords #1 and #2, retransmission-related information such as NDI information and RV information is generated. The retransmission information channel selection section 231 selects the channel (PHICH or PDCCH (UL grant)) to transmit the retransmission information.

The scheduler 234 determines uplink and downlink resource allocation information based on channel quality information (CQI) given from the channel quality measurement section 221, and PMI information and RI information given from a precoding weight/rank selection section 235, which will be described later.

The precoding weight/rank selection section 235 determines the precoding weight (PMI) for controlling the phase and/or amplitude of transmission signals on a per antenna basis in the mobile terminal apparatus 10, from the uplink received quality in the resource block allocated to the mobile terminal apparatus 10, based on the channel quality information (CQI) given from the channel quality measurement section 221. The precoding weight/rank selection section 235 determines the rank (RI), which represents the number of space multiplexing layers in the uplink, based on channel quality information (CQI) given from the channel quality measurement section 221.

An MCS selection section 236 selects the modulation scheme/channel coding rate (MCS) based on channel quality information (CQI) given from the channel quality measurement section 221.

A dedicated user data generating section 237 generates dedicated downlink transmission data (dedicated user data) for each mobile terminal apparatus 10, in accordance with resource allocation information given from the scheduler 234, from user data input from the higher station apparatus such as the higher station apparatus 30.

A UL grant information generating section 238 generates a DCI format, which includes the above-described UL grant, based on ACK/NACK information and retransmission-related information (NDI information, RV information and so on) given from the retransmission information channel selection section 233, resource allocation information given from the scheduler 234, PMI and RI information given from the precoding weight/rank selection section 235, and MCS information given from the MCS selection section 236.

A PHICH signal generating section 239 generates the PHICH signal, which includes a hybrid ARQ acknowledgement for showing whether or not the transport block needs to be retransmitted to the mobile terminal apparatus 10, based on the ACK/NACK information and retransmission-related information (NDI information, RV information and so on) given from the retransmission information channel selection section 233.

A PDSCH signal generating section 240 generates the downlink transmission data to actually transmit by the PDSCH (Physical Downlink Shard Channel), based on the downlink transmission data (dedicated user data) generated in the dedicated user data generating section 237. A PDCCH signal generating section 241 generates the PDCCH signal to multiplex over the PDCCH, based on the DCI format generated in the UL grant information generating section 238 and including the UL grant.

The PHICH signal, the PDSCH signal and the PDCCH signal generated in these PHICH signal generating section 239, PDSCH signal generating section 240 and PDCCH signal generating section 241 are input in an OFDM modulation section 242. The OFDM modulation section 242 applies an OFDM modulation process to two sequences of signals including these PHICH signal, PDSCH signal and PDCCH signal, and transmits the results to the transmitting/receiving sections 206a and 206b.

An allocation section 243 allocates DM-RS resources per mobile terminal apparatus. The allocation section 243 outputs information about the in this way (for example, the parameters in the first method to the third method), to the DM-RS sequence generating section 231. Among the information of DM-RS sequences (for example, the parameters in the first method to the third method), the allocation section 243 outputs the information to signal through lower layers, to the UL grant information generating section 238.

Part of the information of the allocated DM-RS sequences is signaled to the mobile terminal apparatus 10. For example, the first method signals the base sequence number q. The second method signals parameters required to derive the sequence number q. The third method reports DM-RS sequence candidates through higher layer signaling, and signals information for specifying the DM-RS sequence among the DM-RS sequence candidates through lower layers.

Figure 8:
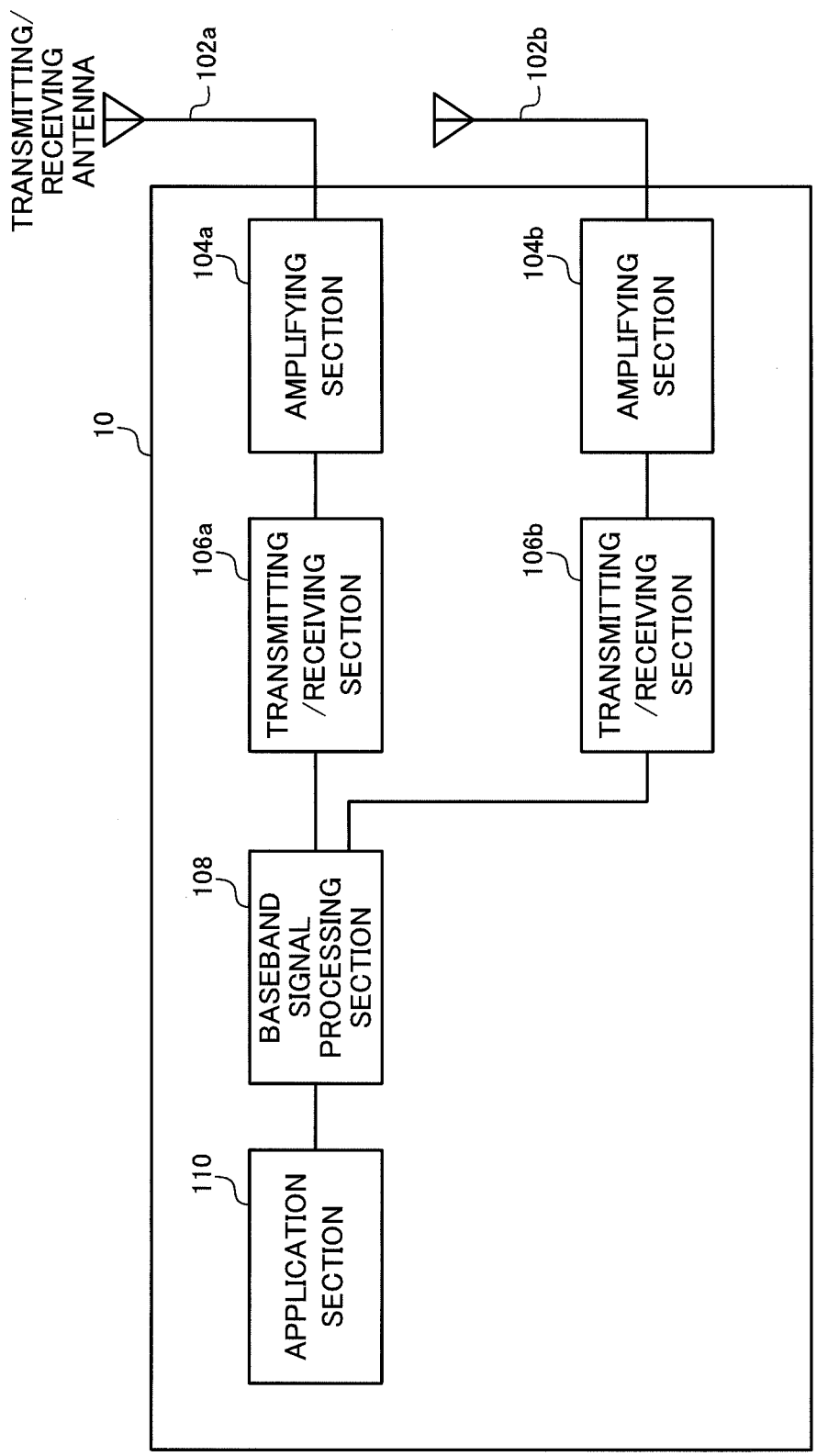
FIG. 8 is a block diagram to show a configuration of a mobile terminal apparatus according to the above embodiment.

Next, a configuration of the mobile terminal apparatus 10 according to the present embodiment will be described with reference to FIG. 8. As shown in FIG. 8, the mobile terminal apparatus 10 according to the present embodiment has two transmitting/receiving antennas 102a and 102b for MIMO transmission, amplifying sections 104a and 104b, transmitting/receiving sections 106a and 106b, a baseband signal processing section 108 and an application section 110.

As for downlink data, radio frequency signals that are received in the two transmitting/receiving antennas 102a and 102b are amplified in the amplifying sections 104a and 104b, and converted into baseband signals through frequency conversion in the transmitting/receiving sections 106a and 106b. The baseband signals are subjected to receiving processes such as an FFT process, error correction decoding and retransmission control, in the baseband signal processing section 108. In this downlink data, downlink user data is transferred to the application section 110. The application section 110 performs processes related to higher layers above the physical layer and the MAC layer. In the downlink data, broadcast information is also transferred to the application section 110.

Uplink user data is input from the application section 110 to the baseband signal processing section 108. The baseband signal processing section 108 performs a retransmission control (H-ARQ: Hybrid ARQ) transmission process, channel coding, precoding, a DFT process, an IFFT process and so on, and transfers the results to the transmitting/receiving sections 106*a* and 106*b*. The baseband signals output from the baseband signal processing section 108 are subjected to a frequency conversion process and converted into a radio frequency band in the transmitting/receiving sections 106*a* and 106*b*, and, after that, amplified in the amplifying sections 104*a* and 104*b* and transmitted from the transmitting/receiving antennas 102*a* and 102*b*.

Figure 9:
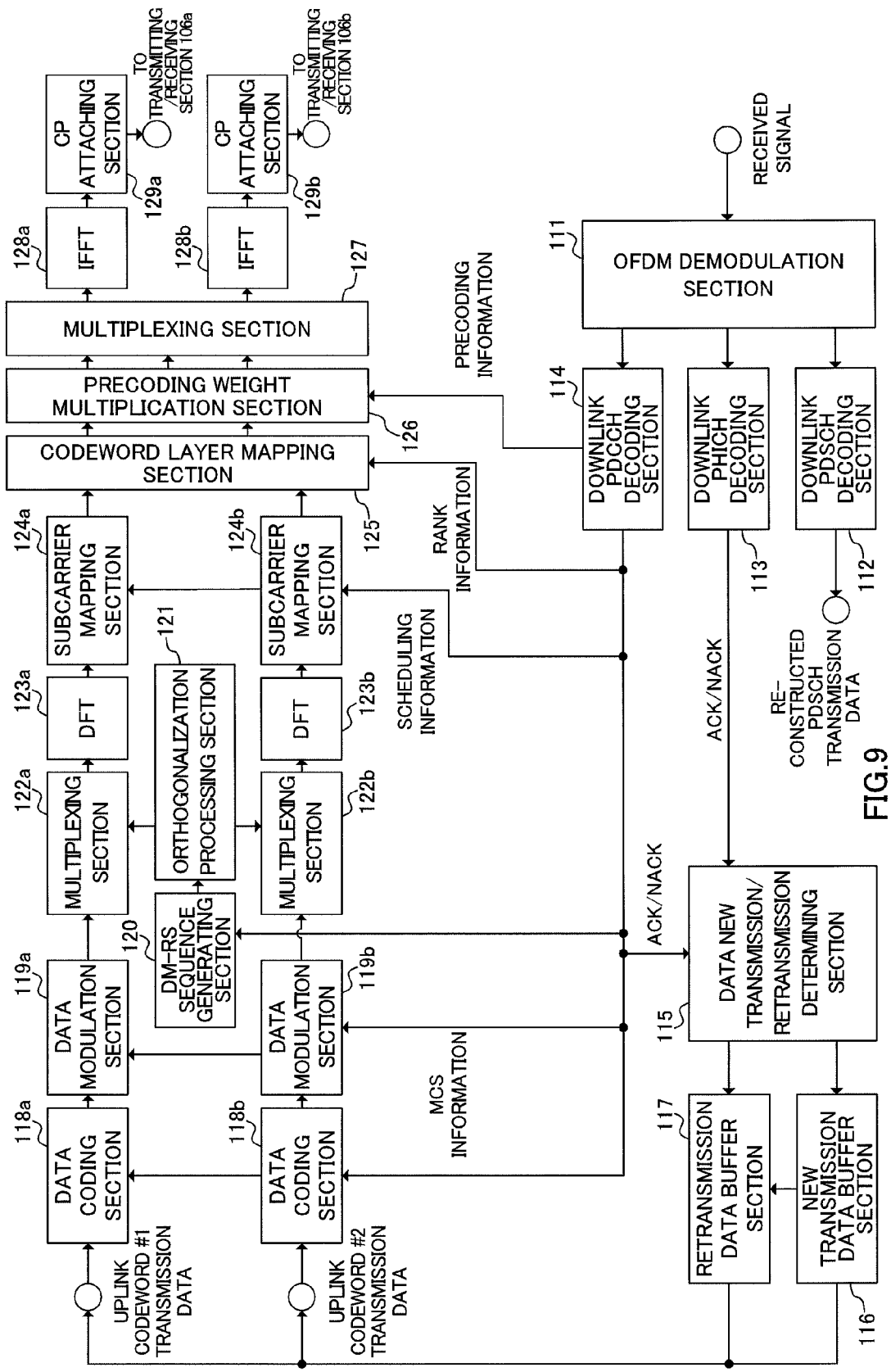
FIG. 9 is a functional block diagram of a baseband signal processing section in the mobile terminal apparatus shown in FIG. 8.

Now, a configuration of the baseband signal processing section 108 in the mobile terminal apparatus 10 according to the present embodiment will be described with reference to FIG. 9. FIG. 9 is a functional block diagram of the baseband signal processing section 108 of the mobile terminal apparatus 10 according to the present embodiment.

Received signals output from the transmitting/receiving sections 106*a* and 106*b* are demodulated in an OFDM demodulation section 111. In the downlink received signals demodulated in the OFDM demodulation section 111, the PDSCH signal is input in a downlink PDSCH decoding section 112, the PHICH signal is input in a downlink PHICH decoding section 113, and the PDCCH signal is input in a downlink PDCCH decoding section 114. The downlink PDSCH decoding section 112 decodes the PDSCH signal, and reconstructs PDSCH transmission data. The downlink PHICH decoding section 113 decodes the downlink PHICH signal. The downlink PDCCH decoding section 114 decodes the PDCCH signal. The PDCCH signal includes the DCI format, which includes the UL grant, used in the communication control method according to the present invention.

The downlink PDCCH decoding section 114 acquires the control information designated by the UL grant. When a hybrid ARQ acknowledgement (ACK/NACK) is included in the PHICH signal decoded in the downlink PHICH decoding section 113, a data new transmission/retransmission determining section 115 determines whether this is new data transmission or retransmission, based on that hybrid ARQ acknowledgement (ACK/NACK). When a hybrid ARQ acknowledgement (ACK/NACK) is included in the UL grant of the PDCCH signal, whether this is new data transmission or retransmission is determined based on that hybrid ARQ acknowledgement (ACK/NACK). The determined results are reported to a new transmission data buffer section 116 and a retransmission data buffer section 117.

The new transmission data buffer section 116 buffers the uplink transmission data input from the application section 110. The retransmission data buffer section 117 buffers the transmission data output from the new transmission data buffer section 116. When a determined result to the effect of new data transmission is reported from the data new transmission/retransmission determining section 115, uplink transmission data is generated from the transmission data in the new transmission data buffer section 116. When a determined result to the effect of data retransmission is reported from the data new transmission/retransmission determining section 115, uplink transmission data is generated from the transmission data in the retransmission data buffer section 117.

The uplink transmission data that is generated is input in a serial-to-parallel conversion section, which is not illustrated. In this serial-to-parallel conversion section, the uplink transmission data is subjected to serial-to-parallel conversion into the number of codewords, depending on the uplink rank. The codewords represent the coding unit in channel coding, and the number thereof (the number of codewords) is determined uniquely based on the rank and/or the number of transmitting antennas. The uplink transmission data is input in data coding sections 118*a* and 118*b*.

The data coding section 118*a* encodes the uplink transmission data. The uplink transmission data encoded in the data coding section 118*a* is modulated in a data modulation section 119*a*, and output to a multiplexing section 122*a*. The data coding section 118*b* encodes the uplink transmission data. The uplink transmission data encoded in the data coding section 118*b* is modulated in a data modulation section 119*b*, and output to a multiplexing section 122*b*.

A DM-RS sequence generating section 120 generates uplink DM-RS sequences (DM-RSs). The DM-RS sequence generating section 120 generates the DM-RS sequences using DM-RS sequence allocation information reported from the radio base station apparatus. Above equation 2 and equation 3 are used for the generation of DM-RS sequences. The DM-RS sequence generating section 120 realizes inter-cell randomization.

At this time, in the DM-RS sequence generating section 120, when the sequence number q is reported in the first method, DM-RS sequences are generated by above equation 2 and equation 3, using the sequence number q. With the second method, in the DM-RS sequence generating section 120, the sequence number q may be derived using an index that is signaled from the radio base station apparatus. With the third method, DM-RS sequences are generated using information that is given through higher layer signaling and lower layer signaling from the radio base station apparatus. The DM-RS sequence generating section 120 outputs the generated DM-RS sequences to an orthogonalization processing section 121.

The orthogonalization processing section 121 applies an orthogonalization process to the DM-RSs. That is, the orthogonalization processing section 121 applies CS and OCC to the DM-RSs. The orthogonalization processing section 121 outputs the DM-RSs, to which the orthogonalization process has been applied, to the multiplexing sections 122*a* and 122*b*.

The multiplexing section 122*a* multiplexes the modulated transmission data and a DM-RS sequence, and outputs the multiplex signal to a discrete Fourier transform (DFT) sections 123*a*. The multiplexing section 122*b* multiplexes the modulated uplink transmission data and a DM-RS sequence, and outputs the multiplex signal to a discrete Fourier transform (DFT) section 123*b*.

The discrete Fourier transform (DFT) sections 123*a* and 123*b* perform a discrete Fourier transform of the multiplex signals and convert the time sequence information into frequency domain information. The discrete Fourier transform (DFT) sections 123*a* and 123*b* output the signals after the DFT to subcarrier mapping sections 124*a* and 124*b*. The subcarrier mapping sections 124*a* and 124*b* perform frequency domain mapping based on scheduling information from the downlink PDCCH decoding section 114. Then, the subcarrier mapping sections 124*a* and 124*b* output the transmission data after the mapping to a codeword layer mapping section 125.

In the codeword layer mapping section 125, the uplink transmission data input from the subcarrier mapping sections 124*a* and 124*b* is divided into a number to match the number of layers, in accordance with uplink rank information from the downlink PDCCH decoding section 114. Then, the divided uplink transmission data is input in a precoding weight multiplication section 126.

The precoding weight multiplication section 126 shifts the phase and/or amplitude of transmission signals, for each of the transmitting/receiving antennas 102a and 102b, based on uplink precoding information from the downlink PDCCH decoding section 114 (weighting of transmitting antennas by means of precoding). By this means, it is possible to increase the received power of received signals in the radio base station apparatus 20, and improve throughput performance. After the precoding, following the multiplexing process in a multiplexing section 127, the transmission signals are subjected to an inverse fast Fourier transform in the inverse fast Fourier transform (IFFT) sections 128a and 128b and converted from frequency domain signals into time domain signals. Then, in cyclic prefix (CP) attaching sections 129a and 129b, cyclic prefixes are attached to the transmission signals. Here, the cyclic prefixes function as guard intervals for cancelling multipath propagation delay and differences in receiving timing between a plurality of users in the radio base station apparatus 20. The transmission signals with cyclic prefixes attached thereto are transmitted to the transmitting/receiving sections 106a and 106b.

With the radio communication method of the present invention, the allocation section 243 of the radio base station apparatus 20 allocates uplink DM-RS sequences. The radio base station apparatus 20 signals DM-RS sequence allocation information to the mobile terminal apparatus 10. For example, the first method signals the base sequence number q. The second method signals parameters required to derive the sequence number q. The third method reports DM-RS sequence candidates through higher layer signaling, and signals information for specifying the DM-RS sequence among the DM-RS sequence candidates through lower layers.

The DM-RS sequence generating section 120 of the mobile terminal apparatus 10 generates uplink DM-RS sequences (DM-RSs). The DM-RS sequence generating section 120 generates the DM-RS sequences using DM-RS sequence allocation information reported from the radio base station apparatus. Above equation 2 and equation 3 are used for the generation of the DM-RS sequences. At this time, in the DM-RS sequence generating section 120, when the sequence number q is reported, DM-RS sequences are generated according to above equation 2 and equation 3, using the sequence number q in the first method. In the DM-RS sequence generating section 120, the sequence number q is derived using an index that is signaled from the radio base station in the second method. DM-RS sequences are generated using information that is given through higher layer signaling and lower layer signaling from the radio base station apparatus in the third method.

In this way, with the present invention, uplink DM-RS sequences are allocated per mobile terminal apparatus and per component carrier, and DM-RS sequence allocation information is reported, so that it is possible to realize signaling of DM-RS sequence parameters for improving the flexibility of allocation of DM-RS resources. The present invention is particularly effective in a system having complex cell structures combining a HetNet and carrier aggregation as shown in FIG. 2.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-108741, filed on May 10, 2012, including the specification, drawings and abstract, is incorporated herein by reference in its entirety.

The invention claimed is:

1. A radio communication system, comprising a radio base station apparatus and a mobile terminal apparatus that is configured to be able to communicate with the radio base station apparatus, and supporting a system band formed with a plurality of component carriers by carrier aggregation, wherein:
the radio base station apparatus comprises:
an allocation section that allocates an uplink demodulation reference signal sequence per mobile terminal apparatus and per component carrier; and
a reporting section that reports to the mobile terminal apparatus:
by higher layer signaling, demodulation reference signal sequence candidates for the mobile terminal apparatus; and
by lower layer signaling, information for specifying one of the demodulation reference signal sequence candidates on the basis of the uplink demodulation reference signal sequence allocated by the allocation section; and
the mobile terminal apparatus comprises:
a generating section that selects one of the demodulation reference signal sequence candidates according to the information for specifying one of the demodulation reference signal sequence candidates to generate a demodulation reference signal sequence per mobile terminal apparatus and per component carrier,
wherein at least one of the demodulation reference signal sequence candidates reported by higher layer signaling is cell-ID based sequence information.

2. The radio communication system according to claim 1, wherein the reporting section of the radio base station apparatus reports the demodulation reference signal sequence candidates including a sequence number q, which is used to generate the demodulation reference signal sequence, to the mobile terminal apparatus.

3. The radio communication system according to claim 2, wherein the reporting of the information by the lower layer signaling is carried out using at least one of downlink control information of a physical downlink control channel and downlink control information of an enhanced physical downlink control channel.

4. The radio communication system according to claim 1, wherein the mobile terminal apparatus derives a sequence number q, which is used to generate the demodulation reference signal sequence, from each of the demodulation reference signal sequence candidates signaled from the radio base station apparatus.

5. The radio communication system according to claim 1, wherein the reporting of the information by the lower layer signaling is carried out using at least one of downlink control information of a physical downlink control channel and downlink control information of an enhanced physical downlink control channel.

6. The radio communication system according to claim 1, wherein, in a carrier aggregation environment formed with a plurality of component carriers, the information is reported per group that is grouped by a plurality of component carriers.

7. A radio base station apparatus in a radio communication system, comprising the radio base station apparatus and a mobile terminal apparatus that is configured to be able to communicate with the radio base station apparatus, and supporting a system band formed with a plurality of component carriers by carrier aggregation, the radio base station apparatus comprising:
- an allocation section that allocates an uplink demodulation reference signal sequence per mobile terminal apparatus and per component carrier; and
- a reporting section that reports to the mobile terminal apparatus:
  - by higher layer signaling, demodulation reference signal sequence candidates for the mobile terminal apparatus; and
  - by lower layer signaling, information for specifying one of the demodulation reference signal sequence candidates on the basis of the uplink demodulation reference signal sequence allocated by the allocation section,
- wherein at least one of the demodulation reference signal sequence candidates reported by higher layer signaling is cell-ID based sequence information.

8. A mobile terminal apparatus in a radio communication system, comprising a radio base station apparatus and the mobile terminal apparatus that is configured to be able to communicate with the radio base station apparatus, and supporting a system band formed with a plurality of component carriers by carrier aggregation, wherein the radio base station comprises an allocation section that allocates an uplink demodulation reference signal sequence per mobile terminal apparatus and per component carrier, the mobile terminal apparatus comprising:
- a receiving section that receives from the radio base station:
  - by higher layer signaling, demodulation reference signal sequences candidates for the mobile terminal apparatus; and
  - by lower layer signaling, information for specifying one of the demodulation reference signal sequence candidates corresponding to the uplink demodulation reference signal sequence allocated by the allocation section; and
- a generating section that selects one of the demodulation reference signal sequence candidates according to the information for specifying one of the demodulation reference signal sequence candidates to generate a demodulation reference signal sequence per mobile terminal apparatus and per component carrier,
- wherein at least one of the demodulation reference signal sequence candidates reported by higher layer signaling is cell-ID based sequence information.

9. A radio communication method in a radio communication system, comprising a radio base station apparatus and a mobile terminal apparatus that is configured to be able to communicate with the radio base station apparatus, and supporting a system band formed with a plurality of component carriers by carrier aggregation, the radio communication method comprising:
- in the radio base station apparatus:
- allocating an uplink demodulation reference signal sequence per mobile terminal apparatus and per component carrier; and
- reporting to the mobile terminal apparatus:
  - by higher layer signaling, demodulation reference signal sequence candidates for the mobile terminal apparatus, and
  - by lower layer signaling, information for specifying one of the demodulation reference signal sequence candidates on the basis of the allocated uplink demodulation reference signal sequence; and
- in the mobile terminal apparatus:
- selecting one of the demodulation reference signal sequence candidates according to the information for specifying one of the demodulation reference signal sequence candidates to generate a demodulation reference signal sequence per mobile terminal apparatus and per component carrier,
- wherein at least one of the demodulation reference signal sequence candidates reported by higher layer signaling is cell-ID based sequence information.

* * * * *

UNITED STATES PATENT AND TRADEMARK OFFICE
CERTIFICATE OF CORRECTION

PATENT NO. : 9,780,932 B2  Page 1 of 1
APPLICATION NO. : 14/399048
DATED : October 3, 2017
INVENTOR(S) : Kakishima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 83 days.

Signed and Sealed this
Twenty-fifth Day of September, 2018

Andrei Iancu
*Director of the United States Patent and Trademark Office*